Patented Oct. 9, 1934

1,976,590

UNITED STATES PATENT OFFICE 1,976,590

ORGANIC PRODUCT OBTAINED FROM MOLASSES AND MOLASSES RESIDUES

Eugenio Antonio Vazquez, Habana, Cuba

No Drawing. Application January 24, 1933, Serial No. 653,289. In Cuba September 15, 1932

8 Claims. (Cl. 18—55)

This invention relates to the production of a material suitable for use in the manufacture of bricks, building tiles and the like from the residue of organic substances obtained from the treatment of sugar cane molasses or beet molasses.

In my copending application, Serial Number 639,486 filed October 25, 1932, I have described and claimed a process for the treatment of sugar cane molasses or beet molasses whereby the organic acids, fats, waxes and other substances constituting the impurities of the molasses are separated therefrom and the residue then treated to separate the sugars from the salts contained therein. As disclosed and claimed in said application, the solution first removed from the molasses containing the organic acids and other impurities can be used in the manufacture of alcohol or useful organic substances may be extracted therefrom. I have now found that this material may be solidified and treated in various ways to produce a product useful in the manufacture of bricks, tiles or other molded products.

In carrying out the present invention, the sugar cane molasses or beet molasses containing substantial amounts of unextracted sugar in combination and admixture with organic salts, coloring matter and other compounds in concentrated form is first treated as disclosed in my said prior application to separate the organic acids and other organic and inorganic compounds from the sugars and inorganic salts in the molasses. The molasses is first submitted to treatment with a mixture of chosen solvents and sulphuric acid, the solvents being so chosen that they will dissolve the freed organic acids and other organic compounds in the molasses but will leave sugars and most of the inorganic salts undissolved.

As the principal solvent I preferably employ a mixture of alcohol (preferably ethyl alcohol of 95 percent strength), an organic compound, which is a non-solvent of sugars and miscible in the alcohol and sulphuric acid. The organic solvents which I employ are preferably ethyl acetate and benzene. In addition to these many others may be used. I may employ any of the chlorinated hydrocarbons, aliphatic hydrocarbons, aromatic hydrocarbons, ethers, esters, aliphatic acids and acid derivatives. As stated, the solvent or solvents chosen should be miscible in alcohol and must be a non-solvent of the sugars and inorganic salts present in the molasses. They must also be good solvents of the other organic constituents of the molasses. In some instances acetone and glycerine can be used in combination with the other solvents mentioned above. The molasses at a temperature of from 70 to 90° F. is treated with an equal weight of alcohol mixed with about 5 percent sulphuric acid and 12½ percent ethyl acetate based on the weight of the original molasses. The amount of alcohol used depends in part on the amount of water contained in the molasses. The solvents are added to the molasses and the mixture is agitated until a uniform mass is obtained. This gradually separates into a dark liquid portion containing the dissolved organic acids and other compounds forming the impurities of the molasses. The undissolved sugars and inorganic salts remain as a pasty and heavier mass. The liquid portion, which is used in making the product of the present invention, is separated from the undissolved sugars and inorganic salts by decanting or otherwise, and concentrated by evaporation. The mass of sugars and inorganic salts are washed with alcohol to remove any traces of the solvent therefrom and this wash liquor is mixed with the decanted solution and concentrated. This decanted liquor, which is dark in color, may be concentrated until it practically solidifies into a mass after cooling and the solvents used in the treatment have been substantially recovered. In carrying out the present invention the concentrated product so obtained may be treated in several ways. It may be heated to a temperature of from 100° C. to 120° C. for a relatively long time up to about 24 hours or to higher temperatures for shorter periods. When so heated the mass is transformed with the evolution of gases into a black resinoidal product. This product is hard, insoluble, infusible and resistant to high temperatures. The extent of these acquired properties is dependent upon the temperature and length of time of the heat treatment. The temperatures must be low enough to prevent vesiculation and should be applied for a sufficient length of time to transform the material and give it the properties referred to above. It may then be ground and heated to remove any acid vapors that remain in the mass. The ground product may then be used as a filler in combination with any of the known binders for the production of molded products, such as bricks, tiles and the like.

The heavy syrup obtained by concentration may also be employed as a binder in admixture with the insoluble, infusible ground product referred to above. By mixing the two in the proportions of about 25 percent of the syrup and 75 percent of the ground product, a molded product may be produced in the following manner. The mixture is placed in the molds and molded cold under heavy pressure. After molding, the products are submitted to a baking at a progressively increasing temperature up to about 250° C. Heavy compact articles, such as building blocks, tiles, bricks and the like, may be formed in this way.

As a further modification the molding may be carried out without pressure followed by the heat treatment set forth above. In this way light porous articles, useful as heat insulators, sound insulators and the like, may be obtained. The molded products may be of any desired size and shape and may be large enough for construction purposes, such as insulating bricks, blocks, slabs and the like.

Likewise the concentrated syrup may be used with other known fillers instead of the ground product and molded to produce bricks, slabs and the like.

The black mass may also be treated with various modifying agents, such as phenol, formaldehyde, casein, gelatin, ammonia, tung oil and other drying oils, castor oil, shellac, cumaron resin, stearine pitches, chlorinated aromatic hydrocarbons and other similar materials whereby the characteristics of the black resinoidal product may be modified by such treatment.

While I have described the invention as being applied to sugar cane molasses or beet molasses it may also be applied to residues of molasses which have been submitted to any treatment for the total or partial extraction of its sugars or which has been submitted to fermentation for the removal of various constituents of the molasses.

I claim:

1. A process for treating acid liquor rich in organic acids and in esters, extracted from molasses through the action of a mixture of sulphuric acid, alcohol and an organic compound miscible in alcohol and non-solvent of sugars and inorganic salts, which comprises heating the concentrated acid liquor to form a hard, non-inflammable, heat resistant, insoluble, infusible, resinoidal product.

2. A process for treating acid liquor, rich in organic acids and in esters, extracted from molasses, through the action of a mixture of sulphuric acid, alcohol and ethyl acetate, which comprises concentrating this liquor, heating the concentrated material to form a hard, non-inflammable, heat resistant, insoluble, infusible, resinoidal product, grinding said product, and adding a binder thereto.

3. A process for treating acid liquor, rich in organic acids and in esters, extracted from molasses, through the action of a mixture of sulphuric acid, alcohol and ethyl acetate, which comprises concentrating this liquor, heating the concentrated material to form a hard, non-inflammable, heat resistant, insoluble, infusible, resinoidal product, grinding said product, adding a binder thereto and molding the material.

4. A resinoidal product formed from acid liquor, rich in organic acids and in esters, extracted from molasses through the action of a mixture of sulphuric acid, alcohol and ethyl acetate, by concentrating said liquor and heating it until it becomes hard, insoluble and infusible, non-inflammable and heat resistant.

5. A binder comprising concentrated acid liquor, rich in organic acids and in esters, extracted from molasses through the action of a mixture of sulphuric acid, alcohol and ethyl acetate.

6. The process of claim 3, wherein the material is molded under pressure and baked to provide heavy compact units.

7. The process of claim 3 wherein the material is molded without pressure and baked to produce light porous units.

8. A process for treating acid liquor rich in organic acids and in esters, extracted from molasses through the action of a mixture of sulphuric acid, alcohol and a solvent selected from the group consisting of ethyl alcohol, benzene, chlorinated hydrocarbons, aliphatic hydrocarbons, aromatic hydrocarbons, ethers, esters, aliphatic acids and acid derivatives which comprises heating the concentrated acid liquor to form a hard, non-inflammable, heat resistant, insoluble, infusible, resinoidal product.

EUGENIO ANTONIO VAZQUEZ.